United States Patent

[11] 3,597,757

[72] Inventors Jacques J. Vincent-Carrefour
La Sapinere, Perros-Guirec;
Jean-Claude Merlin, 1 rue Marcellin
Berthelot, Vanves; Philippe Pitard, 158 rue
de la Convention, Paris, all of, France

[21] Appl. No. 4,325
[22] Filed Jan. 20, 1970
[45] Patented Aug. 3, 1971
[32] Priority Jan. 22, 1969
[33] France
[31] 6901071

[54] VISUALIZATION DEVICE WITH SETS OF VARIABLE CHARACTERS
4 Claims, 5 Drawing Figs.

[52] U.S. Cl. .......... 340/324 A, 340/172.5
[51] Int. Cl. .......... G06f 3/14
[50] Field of Search .......... 340/324 A, 172.5

[56] References Cited
UNITED STATES PATENTS

| | | | |
|---|---|---|---|
| 2,766,444 | 10/1956 | Sheftelman | 340/324 A |
| 3,248,725 | 4/1966 | Low et al. | 340/324 A |
| 3,396,377 | 8/1968 | Strout | 340/324 A |
| 3,404,394 | 10/1968 | Bassett | 340/324 A |

*Primary Examiner*—John W. Caldwell
*Assistant Examiner*—Marshall M. Curtis
*Attorney*—Abraham A. Saffitz

ABSTRACT: System for displaying characters or patterns on the screen of a cathode-ray tube, with each character or pattern formed by a group of vectors and with each vector represented by a binary vector word of which one bit controls illumination and extinction of the spot tracing the vector on the screen and the other bits selectively define predetermined directions of incremental tracks of the spot. The system allows characters stored in a character store in the form of character words including a plurality of vector words to be selectively displayed. The character store is associated with a character address register and upon reception of a character address in said register, the character stored at that address in the character store is displayed. The system permits also the change of the stored characters. For this, a character address word called in the following "fictitious address word" is sent from a remote station; it contains, as a part thereof a vector word contained in the character word of the character to be changed. A selection or chopper circuit chops off suitable bits of the fictitious address word to convert it into the vector word included therein. A function combination detector channels the true character address words towards the address register and the fictitious character address words towards the chopper circuit.

| 1 | 2 | 3 | 4 | 5 | 6 | 7 | 8 |
|---|---|---|---|---|---|---|---|
| 0 1 0 1 | 0 1 0 1 | 0 1 0 1 | 0 0 1 1 | 0 0 0 1 | 1 1 1 1 | 1 1 0 1 | 1 0 0 1 |

| 9 | 10 | 11 | 12 | 13 | 14 | 15 | 16 |
|---|---|---|---|---|---|---|---|
| 1 0 0 1 | 1 0 0 1 | 0 0 0 1 | 0 0 0 1 | 0 0 0 1 | 1 1 0 1 | 1 1 0 1 | 0 0 0 0 |

| 1 | 2 | 3 | 4 | 5 | 6 | 7 | 8 |
|---|---|---|---|---|---|---|---|
| 0 0 0 0 | 0 0 0 0 | 0 0 0 0 | 0 1 0 1 | 0 1 1 1 | 0 1 1 1 | 1 0 0 1 | 1 1 0 1 |

| 9 | 10 | 11 | 12 | 13 | 14 | 15 | 16 |
|---|---|---|---|---|---|---|---|
| 1 1 0 1 | 1 1 0 1 | 0 0 1 1 | 0 0 1 1 | 0 0 1 1 | 1 1 1 0 | 1 1 0 0 | 1 1 0 0 |

INVENTORS:

Jacques J. VINCENT-CARREFOUR,
Jean-Claude MERLIN and
Philippe PITARD

By Abraham A. Saffitz
ATTORNEY

INVENTORS:

Jacques J. VINCENT-CARREFOUR,
Jean-Claude MERLIN and
Philippe PITARD

By Abraham A. Saffitz ATTORNEY

INVENTORS:
Jacques J. VINCENT-CARREFOUR,
Jean-Claude MERLIN and
Philippe PITARD
By Abraham A. Saffitz ATTORNEY

VISUALIZATION DEVICE WITH SETS OF VARIABLE CHARACTERS

The present invention generally relates to a system for displaying on a CRT screen digitally stored characters and, more particularly, a remotely controlled system of this kind in which the characters to be displayed can be changed at will.

U.S. Pat. application Ser. No. 812,640 filed on Apr. 2, 1968 by Jean-Claude Lavenir and Jean-Claude Merlin, describes a system for displaying characters or patterns, in which the character or pattern is traced by the incremental displacement of a spot on a cathode-ray tube in eight quantified directions, namely, in the positive and negative directions along two rectangular axes of coordinates and in rising and declining directions along the bisectrices of these two axes. The movements have a fixed value along the axes of coordinates and the same value, multiplied by $\sqrt{2}$ along the bisectrices. Each displacement of the spot or displacement vector (or more simply vector), is most frequently defined by four bits of which the first three indicate the direction (one out of eight) and the fourth the luminosity (maximum or zero) of the spot. The vector word is therefore in the general case a word of four bits.

Since this concerns alphanumerical characters, it is possible to design these characters so that each of them is defined by a comparatively small number of vectors. This number may vary according to the character and it is possible, for example, to design the most complex character with 16 vectors. The character word therefore comprises 16 vector words that is 64 bits, of which certain vector words may be zero. The last vector word brings the extinguished spot to the starting point of the next character. The distance between two successive starting positions of characters is constant and may be equal, for example to four horizontal vectors.

According to one aspect of the invention there is provided a system for displaying characters or patterns on the screen of a cathode-ray tube, with each character or pattern formed of a group of vectors and with each vector represented by a binary vector word of which one bit controls illumination or extinction of the spot tracing the vector on the screen and the other bits define the direction of the spot displacement, the system comprising a character store for storing binary character words defining the groups of character-forming or pattern-forming vectors to form each character or pattern, a binary address register associated with said character store, the address of each character or pattern having a larger number of digits than the number of digits in the binary vector words, and means for changing the character or pattern corresponding to a given address, said character- or pattern-changing means comprising means adapted to detect a specific function signal and to transmit the binary digital addresses of a plurality of particular characters each of said addresses including bits forming a vector word of the new character or pattern, means controlled by said function signal detecting means and arranged to store temporarily only the digits of preselected weights of the address of each said particular character, each said particular character being such that the stored digits form a vector word representing a respective vector of the new character or pattern, and means to transfer each vector word representing a vector of the new character or pattern into the character store.

The invention will be described by way of example with reference to the accompanying drawings in which:

FIG. 1 shows the eight quantified directions and the vector words associated therewith as used in a preferred system in accordance with the invention;

FIGS. 2*a* and 2*b* show two characters and the corresponding character words in the preferred system;

Figure 1:
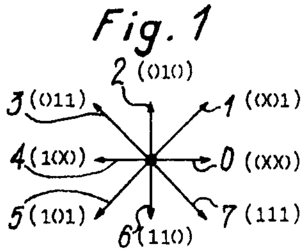
FIG. 1 shows eight directions offset relative to each other through 45°, and with which are associated the eight binary words from 000 to 111.
Figure 2A:
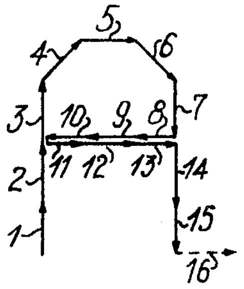
Figure 2B:
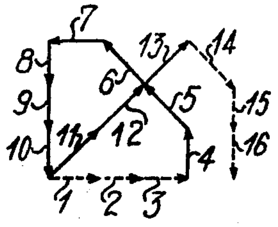

FIGS. 2*a* and 2*b* show the letter A and the letter $\alpha$, as well as the two words of 64 bits corresponding thereto. These words of 64 bits are divided into vector words of four bits each; the different vector words are numbered 1 to 16. The vector word No. 16 of the letter A, and the vector words Nos. 1, 2, 3, 14, 15 and 16 of the letter $\alpha$ terminate with a binary digit specifying zero luminosity.

It may be seen that, with each letter, the start of the vector No. 1 and the end of the vector No. 16 are on the same horizontal line and spaced apart by four vectorial lengths.

Figure 3:
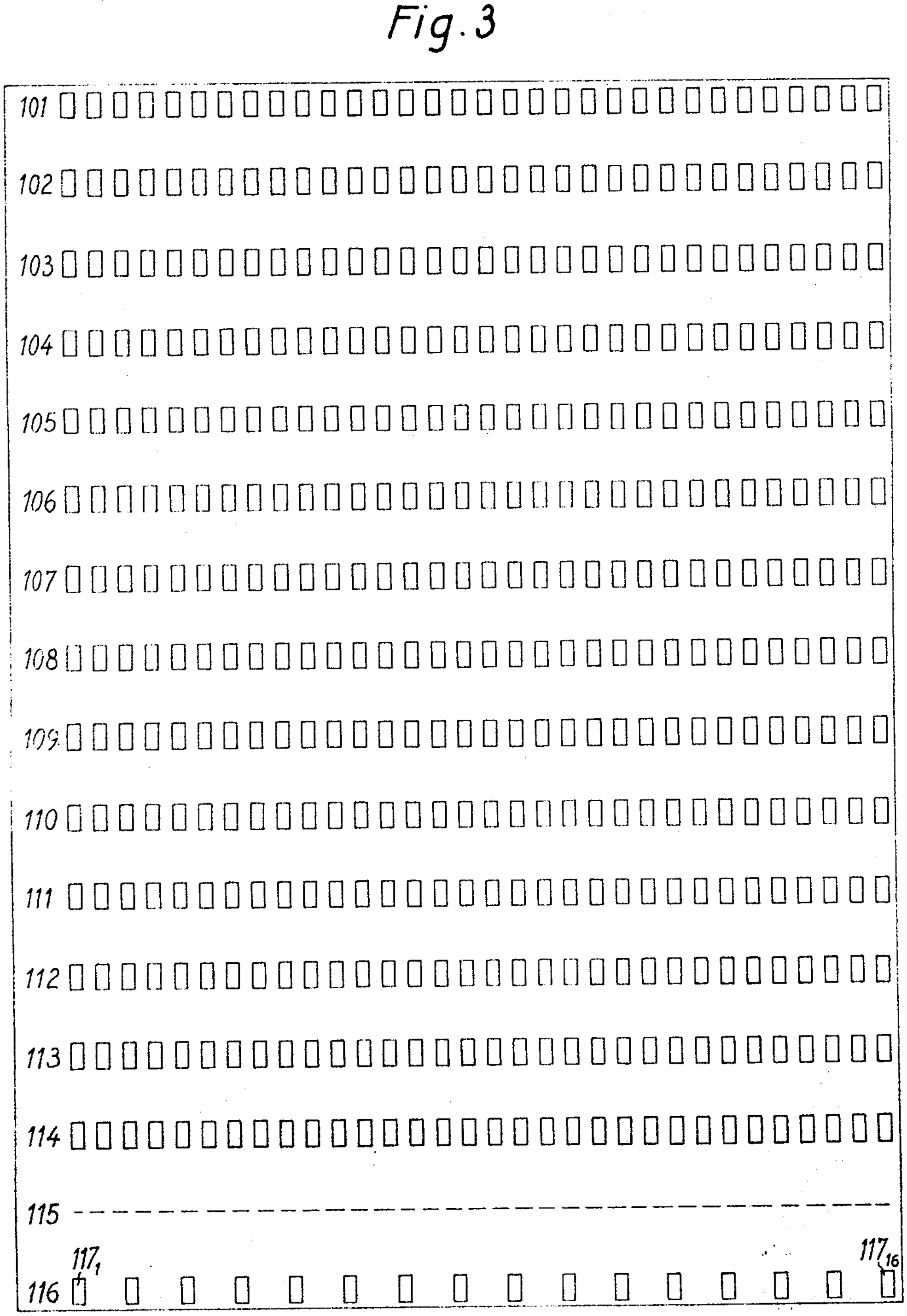
FIG. 3 shows the display screen used in the preferred system.

FIG. 3 shows a display screen which comprises 14 lines 101 to 114 of 32 characters each, a 15th blank line 115 and a 16th line 116. On lines 101 to 114 characters permanently stored in the character store are temporarily displayed under the control of a remotely located operator. On line 116 are permanently displayed the changeable characters in actual use. When a changeable character is actually changed by the operator the new character is being written on line 116 of the screen instead of the old one. In FIG. 3, it is assumed that there are 16 changeable characters $\mathbf{117}_1$ to $\mathbf{117}_{16}$.

Figure 4:
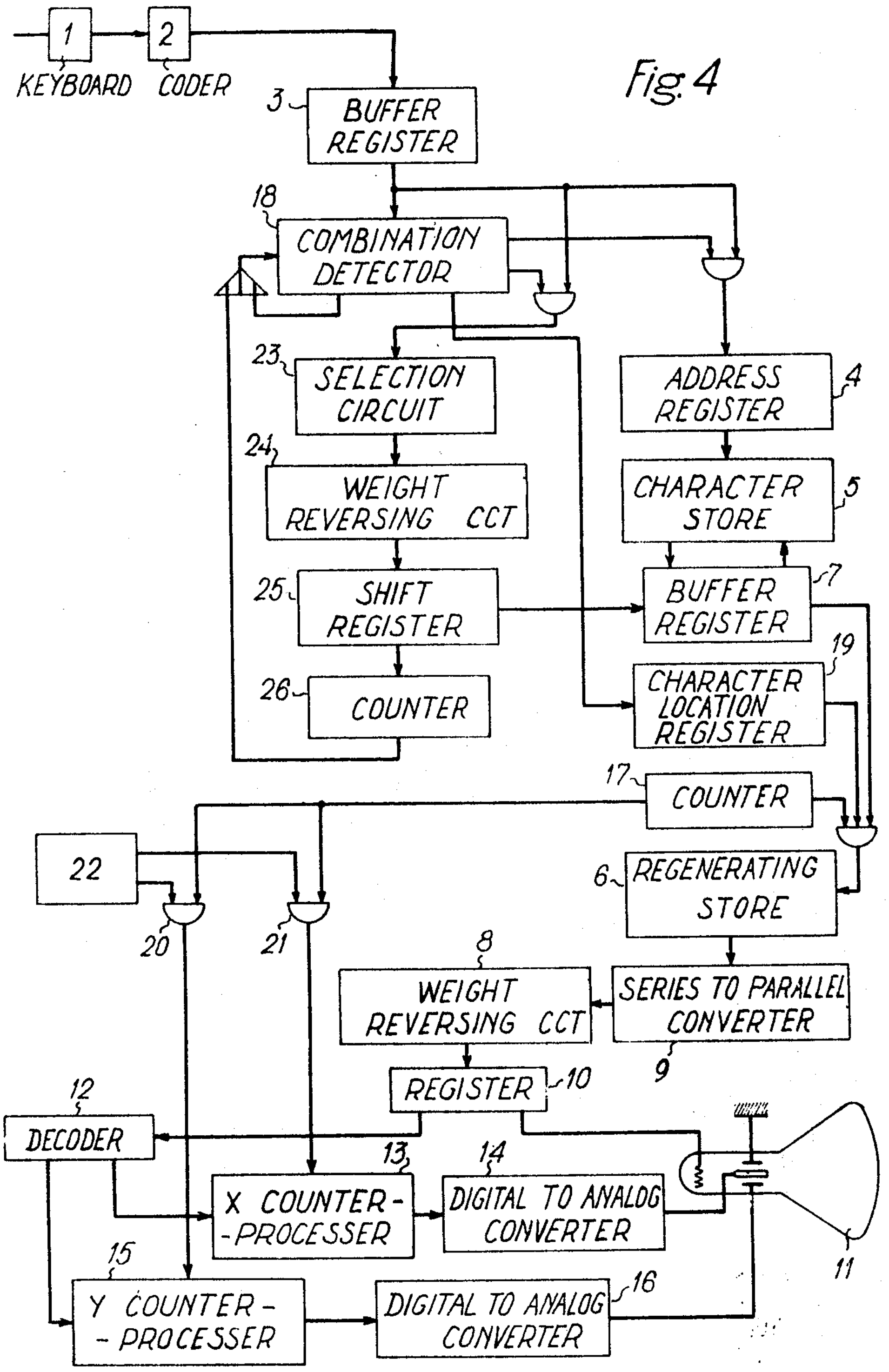
FIG. 4 is a block diagram of the preferred system.

Before dealing with the description of FIG. 4, which is a block diagram of the display system, it is necessary to explain that this system fulfills two functions, mainly the display of a text on the screen, and the modification of a character. The first function operates conventionally, as shown, by making a selection in a memory in which the chosen characters are stored according to the addresses thereof, by transferring the selected characters to a regeneration store and maintaining them in display by this regeneration store. The second function forms the novelty of the system.

Referring now to FIG. 4, a keyboard 1 and a coder 2 made it possible to transmit to the display device, on one hand the addresses of the permanent or modifiable characters in a character store 5, and on the other hand the character words of the characters being changed. As the total number of characters (unchangeable plus changeable) is assumed to be less than 64, these addresses are 6-bit addresses. In the case where, instead of transmitting the address of a character in use, it is desired to introduce a new character into the store of characters 5, words with sic bits will still be transmitted. These have no longer the significance of an address but a part of them have the significance of vector words, as will be explained in the following.

The 6-bit addresses are received in a buffer register 3. The output of buffer register 3 is connected permanently to a function combination detector 18 and selectively either to an address register 4 during a period of display of a text on the screen or to a chain of circuits 23 to 26 during a period of modifying the characters. The function combination detector 18, on receipt of the function combination initiating the modification of characters, makes the connection of register 3 to selection circuit 23 instead of the connection of register 3 to address register 4.

The function combination detector can detect a second function combination signal, for example the combination "-carriage return," for setting the character location register 19 in any predetermined position. The character location register 19 indicates the address on the last line on the screen of the character to be changed. As this address can vary from 0 to 15, the number of "carriage return" signals in the sequence can also vary from 0 to 15.

The character words are stored in the character store 5. Since the image must be regenerated about every 25 milliseconds to ensure its persistance during the display, the character words whose addresses are received in the address register 4 are successively transferred to a regenerating store 6 via a buffer register 7.

The regenerating store 6 comprises as many locations for character words as there are altogether characters to display. It is connected to a series-to-parallel converter 9 which is connected to a circuit 8 for inversion of a binary digit of a given weight to be described hereinafter and to a register 10. The output of the last flip-flop of this register 10 which receives the illumination bit is connected to the grid of the cathode-ray tube 11. The three other flip-flops of this register 10 are connected to a decoder 12; two chains start from this decoder, one chain comprising an X counter-processor 13 and an abscissa digital-to-analog converter 14 and the other chain a Y counter-processor 15 and an ordinate digital-to-analog converter 16. The chains of circuits 10 to 16 are known in the prior art and are described, for example, in greater detail in the above mentioned patent application. The function of circuit 8 will be described further below.

The regenerating store 6 is a circulation store of known type such as a looped shift register or a magnetostriction store.

Connected to the regenerating store 6 are a counter 17 and a character location register 19. The counter 17 counts counting pulses and supplies three outputs consisting of the number of the line being displayed, the number of the character in said line and the number of bits. Since each character has $2^6$ bits and each line $2^5$ characters, the counter 17 counts in units of weights $2^0$, $2^6$ and $2^{11}$. It is controlled synchronously with the regenerating store 6 by a time base not shown. For example, during the displaying of the 20th character (character No. 19) of the 10th line (line No. 9), the output $2^{11}$ counts 9, the output $2^6$ counts 19 and the output $2^0$ is counting from $$9\times2^{11}+19\times2^{6}=19\ 648$$

to 19 711.

Register 19 indicates the address of a character on the screen (line number and character number on the line) and the address of this character in the regenerating store 6. Register 19 advances one step each time a character is transferred from buffer register 7 to regenerating store 6; it can also be set in any predetermined position by sending to it a suitable number of carriage return characters. Since the changeable characters are all displayed on the last line of the screen the address of a character to be changed is comprised between 0 and 15.

The output $2^{11}$ of counter 17 is connected to two AND gates 20 and 21. The second inputs of said AND gates are connected to two terminals of a zero resetting and incrementation circuit 22 which furnishes on its two outputs DC voltages corresponding to the line return horizontal deflection voltage and the line space vertical deflection voltage. It follows from this arrangement that, when one line is completed the output $2^{11}$ of counter 17 applies a pulse to gates 20 and 21 and the X counter-processor 13 is reset to zero and the Y counter-processor 15 is incremented by an amount corresponding to a line space.

The function combination or the sequence of function combinations which is allotted for initiating the function "modification of character" is detected by the function combination detector 18 which directs the incoming signals towards the chain of circuits 23 to 26. This chain comprises a circuit 23 for selecting in each 6-bit word the four bits of lower weight, a circuit 24 inverting the bit of a given weight, a shift register 25 and a counter 26 for counting words of four bits.

The shift register 25 has 64 flip-flops and is connected in parallel to the buffer register 7 with the same capacity.

After the detector 18 has channelled the output of the buffer register 3 towards the selection circuit 23, the 6-bit words transmitted by the keyboard 1 associated with the coder 2, are truncated or chopped by the selection circuit 23 and only the lowest weight four bits of each character are preserved to define the vector words the assembly of which forms the character word to be entered into the character store 5.

Sixteen 6-bit words are successively transmitted and the character word formed by the last four digits of each of the 16 6-bit words are recorded, in groups of four bits, in the shift register 25. The counter 26, having counted up to 16, resets the detector 18 into the position in which the incoming signals pass to the address register 4. The following address is therefore registered in the address register 4 with all its six binary digits; this is the address to which the character word contained in the shift register 25 must be transferred into the character store 5.

The following is an example of the change of character. It will be assumed that the character A (FIG. 2*a*) is a changeable character and that it has been placed at the address 42 of the character store 5. It is formed by the following vector word sequence:

| | | | | | | | | | |
|---|---|---|---|---|---|---|---|---|---|
| 1 | 0 | 1 | 0 | 1 | 9 | 1 | 0 | 0 | 1 |
| 2 | 0 | 1 | 0 | 1 | 10 | 1 | 0 | 0 | 1 |
| 3 | 0 | 1 | 0 | 1 | 11 | 0 | 0 | 0 | 1 |
| 4 | 0 | 0 | 1 | 1 | 12 | 0 | 0 | 0 | 1 |
| 5 | 0 | 0 | 0 | 1 | 13 | 0 | 0 | 0 | 1 |
| 6 | 1 | 1 | 1 | 1 | 14 | 1 | 1 | 0 | 1 |
| 4 | 1 | 1 | 0 | 1 | 15 | 1 | 1 | 0 | 1 |
| 8 | 1 | 0 | 0 | 1 | 16 | 0 | 0 | 0 | 0 |

wherein, as mentioned, the last bit relates to the luminosity of the spot.

If it is to be replaced by the character $\alpha$ (FIG. 2*b*) formed by the following sequence of vector words:

| | | | | | | | | | |
|---|---|---|---|---|---|---|---|---|---|
| 1 | 0 | 0 | 0 | 0 | 9 | 1 | 1 | 0 | 1 |
| 2 | 0 | 0 | 0 | 0 | 10 | 1 | 1 | 0 | 1 |
| 3 | 0 | 0 | 0 | 0 | 11 | 0 | 0 | 1 | 1 |
| 4 | 0 | 1 | 0 | 1 | 12 | 0 | 0 | 1 | 1 |
| 5 | 0 | 1 | 1 | 1 | 13 | 0 | 0 | 1 | 1 |
| 6 | 0 | 1 | 1 | 1 | 14 | 1 | 1 | 1 | 0 |
| 7 | 1 | 0 | 0 | 1 | 15 | 1 | 1 | 0 | 0 |
| 8 | 1 | 1 | 0 | 1 | 16 | 1 | 1 | 0 | 0 |

wherein the last bit relates again to the luminosity of the spot, one transmits the 16 characters of the following table, coded in Flexowriter code, by means of the keyboard 1:

| Character | FLEXO code | Vectors obtained by chopping to four binary numbers |
|---|---|---|
| Φ | 1 0 0 0 0 0 | 0 0 0 0 |
| Φ | 1 0 0 0 0 0 | 0 0 0 0 |
| Φ | 1 0 0 0 0 0 | 0 0 0 0 |
| 5 | 1 0 0 1 0 1 | 0 1 0 1 |
| 7 | 1 0 0 1 1 1 | 0 1 1 1 |
| 7 | 1 0 0 1 1 1 | 0 1 1 1 |
| 9 | 1 0 1 0 0 1 | 1 0 0 1 |
| *x* | 1 0 1 1 0 1 | 1 1 0 1 |
| *x* | 1 0 1 1 0 1 | 1 1 0 1 |
| *x* | 1 0 1 1 0 1 | 1 1 0 1 |
| 3 | 1 0 0 0 1 1 | 0 0 1 1 |
| 3 | 1 0 0 0 1 1 | 0 0 1 1 |
| 3 | 1 0 0 0 1 1 | 0 0 1 1 |
| = | 1 0 1 1 1 0 | 1 1 1 0 |
| , | 1 0 1 1 0 0 | 1 1 0 0 |
| . | 1 0 1 1 0 0 | 1 1 0 0 |

It may be seen that the four last bits of each code such as shown in the third column of the table, are exactly the vector words forming the character $\alpha$.

After the 16 6-bit words, the sign + is transmitted in Flexowriter code, written as 1 0 1 0 1 0, translated into decimal as 42.

The function of the circuits 8 and 32 for inverting the bit of a certain binary weight will now be explained.

It has been shown that, for transmitting a character word of 16 vector words, 17 words of six bits each are transmitted, of which the first 16 words have two bits chopped off so as to form 16 vector words and the 17th, not chopped, is the address in store 5 of the transmitted character. In this instance, the counter 26 counts 16 groups of four bits.

If a character word comprises less than 16 vector words, only those of the vector words are transmitted to the character store which are significant. In the character store, a character word with less than 16 vector words is completed by groups of four zeros. Now, the word 0 0 0 0 represents a horizontal vector described from the left to the right with the spot extinct.

Without any further precaution taken, after having traced the character, the spot would describe as many horizontal vectors, as there are vector words wholly formed of zeros and the following character would not start in the correct position.

This difficulty is overcome by inverting, by means of the circuit 8, the value of the binary digit of binary weight three (the left-hand or highest weight digit) of alternate "four zero" vector words. Thus, every other 0 0 0 0 group is changed into the group 1 0 0 0 and the spot describes, whilst remaining extinct, a horizontal vector towards the right and a horizontal vector towards the left. It does not, therefore, wander away from the character which has just been described by more than the distance which is necessary to respect the interval between consecutive characters.

A further additional precaution must be taken. As a matter of fact, the inversion circuit 8 for inverting the value of a bit of given weight would operate, without any selectivity, with regard to all vector words, whilst it should only operate with regard to zero vector words and not with regard to significant vector words. To this end, a second circuit 24, identical to the circuit 8 is mounted in the chain which is used for writing the characters into the character store 5. This circuit 24 inverts the bits of binary weight three of all the words of significant vectors. Since the zero vector words are not transmitted, no inversion is effected with regard to them by the circuit 24. The circuit 8 restores to the original state the inverted bit of binary weight three of the significant vector words but actually reverses the bit of weight three of complementary vector words which have not been changed by the circuit 24.

Since the words of zero vectors are not transmitted, the counter 26 does not count up to 16 and can no longer serve to direct buffer register 3 towards address register 4 at the end of the transmission of the vector words. In this case, the keyboard transmits, after the last word with six significant digits, a special combination which directs register 3 towards register 4 and then a new 6-digit word which is the address of the new transmitted character in the character store 5.

Obviously, the transfers of inscription and readout in the stores and outside the stores are carried out by means of a programmer. The transfer gates, which are of known construction, are not shown in FIG. 4.

In the above-described system, characters or patterns, the trace of which is stored in the character store can be changed at will. It is therefore easy to substitute in the display stage a given alphabet for another alphabet, to change a list of symbols associated with an alphabet, and the like.

What we claim is:

1. A system for displaying characters on the screen of a cathode-ray tube, with each character formed of a group of vectors and with each vector represented by a binary vector word of which one bit controls illumination and extinction of the spot tracing the vector on the screen and the other bits selectively define predetermined directions of the tracks of the spot, the system comprising a character store for storing groups of vector words defining the groups of character-forming vectors to form each character, a binary address register associated with said character store, the address of each character in said character store having a larger number of bits than the number of bits in the vector word defining each vector, and means for changing the character corresponding to a given address, said character changing means comprising means adapted to transmit the digital addresses of a plurality of particular characters, each of said addresses including a respective vector word of the new character, means arranged to store temporarily only the bits of preselected weights of the address of each said particular character, each said particular character being selected so that the stored bits form a vector word representing a respective vector of the new character, and means for transferring each vector word representing a vector of the new character into the character store.

2. A system for displaying characters on the screen of a cathode-ray tube, with each character formed of a group of vectors and with each vector represented by a binary vector word of which one bit controls illumination and extinction of the spot tracing the vector on the screen and the other bits selectively define predetermined directions of the tracks of the spot, the system comprising a character store for storing groups of vector words defining the groups of character-forming vectors to form each character, a binary address register associated with said character store, the address of each character in said character store having a larger number of bits than the number of bits in the vector word defining each vector, means for receiving the character addresses of the characters to be displayed and for displaying on the screen a character stored in the character store at a received character address, and means for changing the character corresponding to a given address, said character-changing means comprising means for receiving a predetermined number of fictitious addresses of a plurality of particular characters, each of said fictitious addresses including a respective vector word of the character to be changed, and the address of the character to be changed, means for selecting in said fictitious addresses only the bits of preselected weights which form the vector word included therein, means for counting the number of fictitious addresses and for directing to the address register the address of the character to be changed, and means for transferring each vector word derived from the fictitious addresses into the character store at the address of the character to be changed.

3. A system for displaying characters according to claim 2 which comprises in addition a detector of a function combination signal and means under the control of this detector for channelling the character addresses towards the address register and the fictitious character addresses serving for elaborating the vector words of the character to be changed towards the selecting means.

4. A system for displaying characters according to claim 2, in which certain fictitious character addresses include a significant vector word and other fictitious character addresses include a zero vector word, of which only the fictitious character addresses including a significant vector word are transmitted and received in the fictitious character address-receiving means and the vector words derived therefrom transferred into the character store, the system comprising a first inverter for the binary digit of the highest weight in each vector word derived from a fictitious character address, and a second inverter for the binary digit of the highest weight of all the vector words extracted from the character store.